Aug. 22, 1933.　　　I. B. AYAD　　　1,923,963
AERIAL SAFETY DEVICE
Filed Oct. 21, 1931　　　3 Sheets-Sheet 1
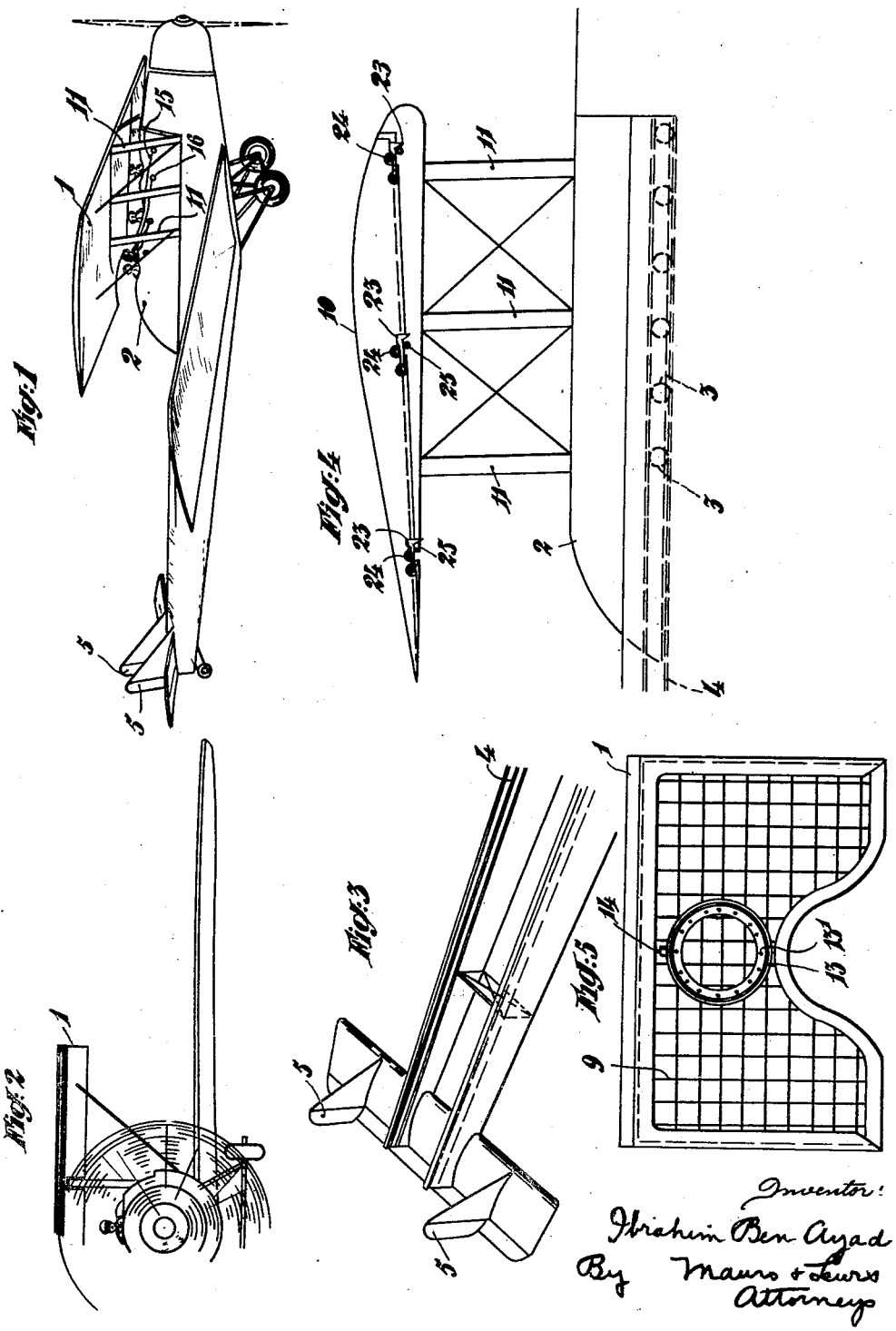

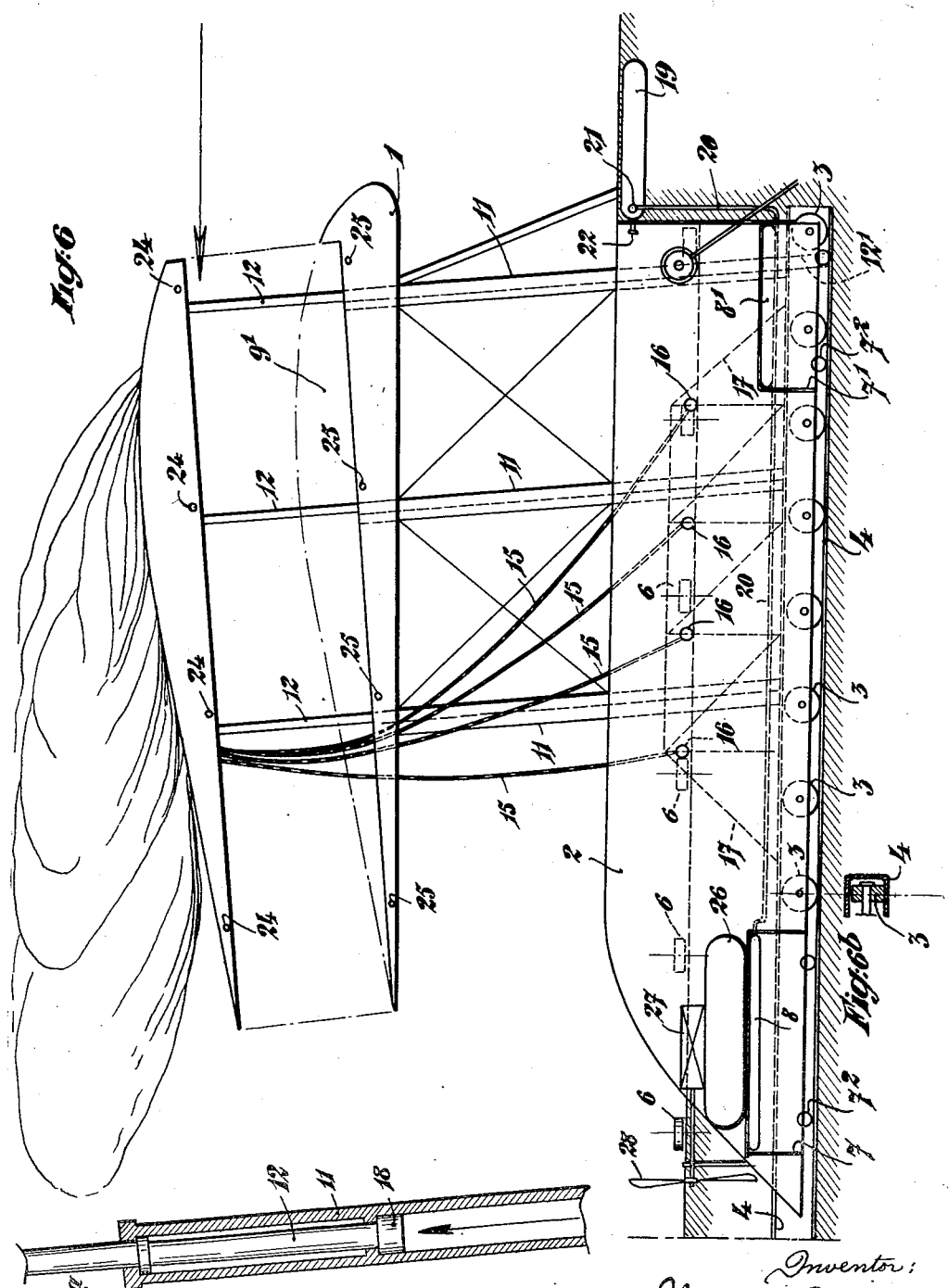

Aug. 22, 1933.　　　I. B. AYAD　　　1,923,963
AERIAL SAFETY DEVICE
Filed Oct. 21, 1931　　　3 Sheets-Sheet 3
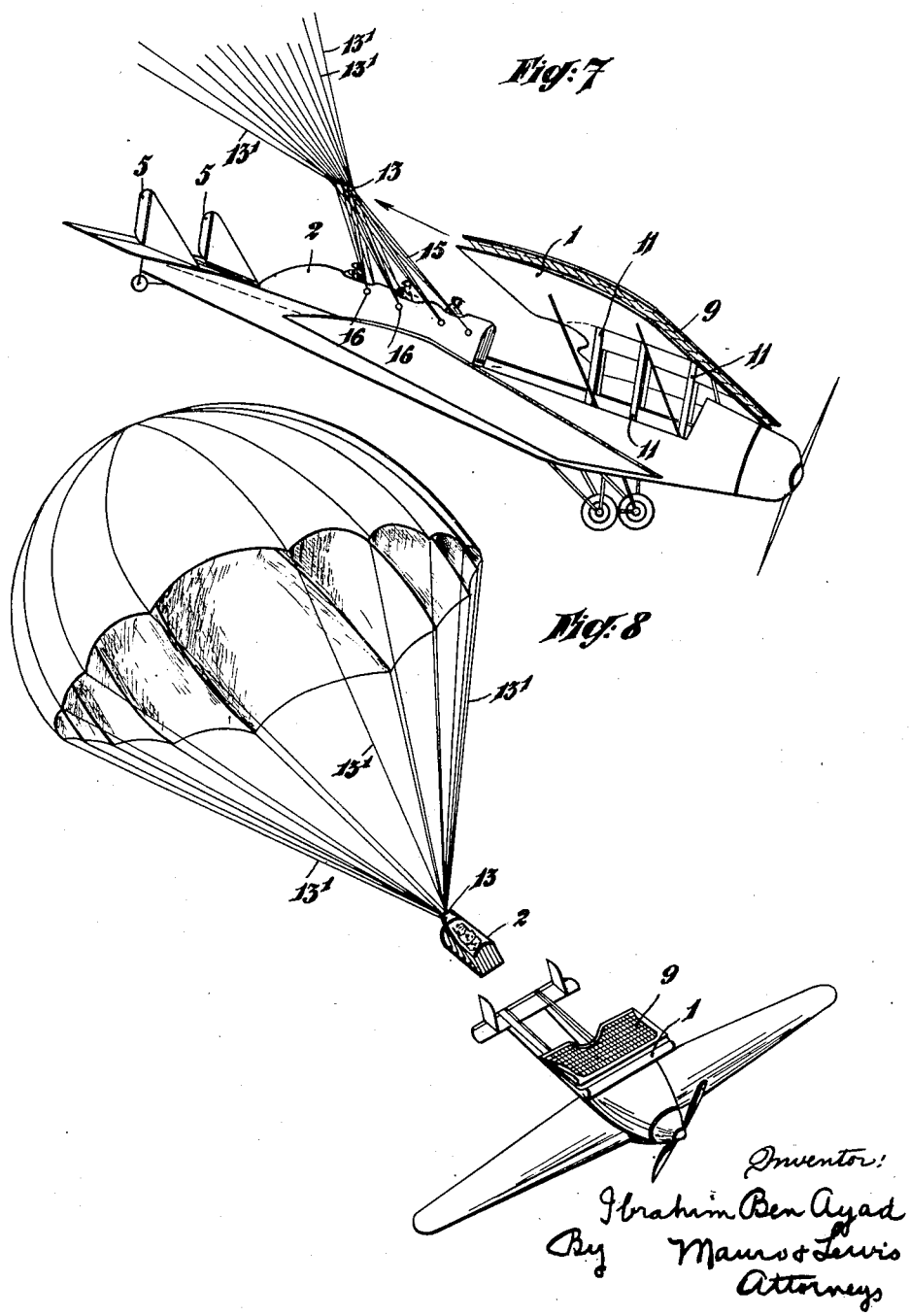

Patented Aug. 22, 1933

1,923,963

UNITED STATES PATENT OFFICE 1,923,963

AERIAL SAFETY DEVICE

Ibrahim Ben Ayad, Paris, France

Application October 21, 1931, Serial No. 570,222, and in France October 23, 1930

4 Claims. (Cl. 244—21)

As a result of the many drawbacks that are inherent in individual parachutes, various devices of aerial safety have been imagined, such as detachable bodies and nacelles provided with parachutes.

However, none of the known methods for ensuring the collective landing of the passengers and pilot of a disabled aircraft is capable of protecting the safety apparatus itself against the considerable risks of breaking which will certainly result from a collision, or shocks, or sudden frictions between the detachable body or nacelle and the rear part of the fuselage, and the control planes, when said body or nacelle is being detached.

On the other hand, the devices already known do not afford any guarantee as regards the prompt and safe unfolding of the sail of the parachute, and this is an essential condition when a collective safety device is concerned, as any delay in the opening of the parachute may completely destroy the efficacy of the device.

Attention is therefore called to the many advantages which result from the arrangement according to my invention, among which the following:

1. The use of a detachable body or nacelle adapted to slide in a roller track leading to the rear extremity of the aircraft, which extremity is kept free, makes it possible to prevent any possibility of a collision between the detachable body and the fuselage while said body is being detached, whereas the frictional stresses are reduced to a minimum owing to an appropriate rolling arrangement. A similar device will therefore be necessary even in the case of a tailless airplane. In the device according to my invention, the detachable body or nacelle is kept integral with the aircraft as long as it has not reached the rear extremity, thus avoiding the dangerous zone.

2. The use of a grid shaped parachute carrying element adapted to be automatically uncovered makes it possible to present to the air pressure resulting from the speed of displacement of the aircraft a considerable initial surface of the inner face of the sail, and to produce its immediate and safe unfolding. As a mater of fact, it is known that the frequent failure of individual parachutes to open is chiefly due to the fact that, in said parachutes, the sail is first subjected only to actions on its external surface.

The arrangement of the parachute in the wing of the aircraft makes it possible to avoid the necessity of surfaces offering a great head resistance.

Preferred embodiments of my invention will be hereinafter described with reference to the appended drawings, given merely by way of example and in which:

Fig. 1 shows a biplane whose lower wing is the main wing, while the upper main wing covers a latticed parachute carrying plane;

Fig. 2 is a front view of the airplane shown in Fig. 1;

Fig. 3 shows, on a larger scale, the rear extremity of the fuselage, which consists of two parallel girders, the control organs and the vertical fins being disposed laterally on either side of the longitudinal axis of the aircraft;

Fig. 4 is a side view of an auxiliary wing according to my invention, provided with its cover, the parachute carrying grid being lowered upon its screen;

Fig. 5 is a top plan view of the auxiliary wing;

Fig. 6 is a longitudinal section of the detachable nacelle and of the parachute carrying wing, together with their accessories;

Figs. 6a and 6b are detail views;

Fig. 7 shows the safety device as it is being detached from the disabled aircraft under the action of the unfolded sail of the parachute. The whole is moveable along a roller track acting as a slide, extending to the rear part of the fuselage, which is kept unobstructed, Fig. 8 shows the safety device, with its sail unfolded, completely detached from the falling airplane.

As shown in Fig. 6, the body 2 of the detachable nacelle is provided with rollers 3 allowing it to slide along the roller track consisting of two U-shaped rails 4 fixed in a symmetrical manner to the rear girders of the fuselage and extending to the rear extremity thereof, the tail controls 5 being disposed laterally as shown in Fig. 3.

A plurality of rollers, having vertical axes such as 6, suitably spaced along said track, serve to diminish lateral friction (Fig. 5).

Two shock absorbing boxes, 7 and $7^1$, provided at their upper part with air chambers 8 and $8^1$, are disposed before and behind the detachable nacelle between the main girders which form the frame of said nacelle. Said boxes, which are adapted to deaden the shock at the time of landing, are provided, along their longitudinal axis, with two rollers $7^2$ allowing them to be displaced together with the detachable nacelle.

The auxiliary upper wing 1 of the airplane is a thick wing made of two parts, the lower part acting as a kind of screen for shielding the upper part from the wind. Said upper part consists of the parachute carrying grid 9. Said grid, which is shown in plan view in Fig. 5, is provided with two lateral cheeks 9¹, the section of which completes the section of the lower part of the wing when the grid is applied against its windshield, as shown in dotted lines in Fig. 6.

The parachute, which is so disposed on the grid that a great part of its inner surface may be exposed to the wind, is protected by a cover 10 fixed by means of securing hooks 23, as shown in Fig. 4. Said cover 10 consists of a movable lid disposed over the grid and forming part of the upper wing under normal conditions, i. e. when the release means are not operated.

Auxiliary wing 1, whose span is relatively small, is fixed to the fuselage of the airplane through posts such as 11 (Fig. 6). Said posts, which are six in number, consist, in the usual manner, of tubes of streamline section.

Rods 12, whose upper extremities are secured to the longitudinal elements of the grid, are adapted to slide in these tubes 11. Under normal conditions, said rods are located at the lower part of said tubes 11 and the parachute carrying grid is thus maintained against the lower part of the wing which shields it against the action of the air. When rods 12 are in their lower position, the extremities of two of them, for instance of the front rod and of the rod which is symmetric therewith with respect to the axis of the aircraft, extend throughout the U-shaped girder of the roller track and their prolonged parts butt at 12¹ against the front rollers of the device, so as to maintain the detachable nacelle in position, which constitutes a suitable locking arrangement. It will therefore be understood that said rollers are released and the detachable nacelle is disengaged as soon as said rods are moved up. The rear part of auxiliary wing 1 is provided with a notch, as shown in Fig. 5.

A ring 13, to which the ropes 13¹ of the parachute are secured, is disposed on the parachute carrying grid 9. Said ring 13 may be provided with a spring fastening 14 adapted to keep it in position and to release it under the effect of the traction exerted by the parachute ropes, when the parachute is brought into action.

Two series of cables such as 15 (Fig. 6), secured in a symmetrical manner on either side of the detachable nacelle, are fixed to the lower part of said ring. The lower ends of said cables are connected to fastening elements 16, securely wedged into trapezoidal girders symmetrically fixed on the longitudinal girders of the frame, as shown by dotted line at 17 (Fig. 6).

In order to provide for the automatic upward displacement of the parachute carrying grid at the proper moment, the lower end of rods 12 is provided (as shown in section in Fig. 6a) with pistons 18 which may be actuated through compressed air. To this effect, a compressed air reservoir is fitted on the fuselage of the aircraft and is connected with the lower part of tubes 11 through conduits 20. An inlet valve 21, controlled by the pilot through a cock 22, makes it possible to feed air into tubes 11 at the desired moment and thus force the grid to be moved upwardly. The upward movement of the grid might also be produced by means of spiral springs which might be made to act through a special release device.

In Fig. 4, cover 10 is maintained in position through hooks 23, secured on the cheeks of the cover. When the grid is applied upon the wing, said hooks are held between two stops 24 and 25, fixed, respectively, on the cheeks of the grid and on those of the wing. It will therefore be readily understood that the cover is automatically released as soon as the grid is moved upwardly. On the other hand, a small compressed air reservoir 26, disposed in the nacelle, is adapted to allow the pilot to actuate, in case of need, a small compressed air machine 27 provided with a propeller 28. Said propeller is intended to allow the pilot to choose a suitable point of landing.

Means may also be provided for getting rid of the parachute sail, in case of need, immediately after landing. This may be necessary chiefly in case of a high wind or when the nacelle alights on water. Said means might consist, for example, for the above described device, in making fastening pieces 16 of the parachute cables 15 easily detachable. In case of a closed body, it is possible to make said body perfectly fluid tight, so as to provide for the case of said nacelle alighting on water. Attention is called to the fact that, as the accessories and the control instruments must not be part of the detachable nacelle but must be fixed to the fuselage, the corresponding wall of the nacelle should be kept unobstructed and simply consist, for instance, of series of bars. It would therefore be necessary, in order to provide, in case of need, for the water tightness of that front wall, to provide for that part of water tight closing device adapted to operate, eventually, in an automatic manner.

The operation of the device according to my invention is as follows:

As soon as the pilot realizes that his airplane is in danger, he acts upon control 22 of inlet valve 21 of compressed air reservoir 19. Rods 12 and, consequently, the parachute carrying grid 9, are thus moved in an upward direction. The detachable nacelle will thus be released and the cover will be detached from the lower part of the wing. The air pressure resulting from the speed displacement of the airplane will act through the grid thus uncovered, thus producing, together with the effort of suction applied on the upper face, the safe and quick unfolding of the parachute. The detachable nacelle will be driven in the direction opposite to the displacement of the airplane under the action of the parachute. Said nacelle will be brought along the roller track to the rear extremity of the fuselage and will be detached from the disabled airplane without any shock or sudden friction.

The downward motion of the parachute will take place under the same conditions as in the case of individual parachutes, with that difference that it will be possible to reduce the speed considerably by making use of sails of much greater surface, being given that the space occupied by said sail is not so much limited as in the case of individual parachutes.

While I have disclosed what I deem to be preferred embodiments of my invention, I do not wish to be limited thereto, as there might be changes made in the construction, disposition and form of the parts without departing from the principle of my invention as comprehended within the scope of the appended claims.

What I claim is:

1. An airplane, comprising in combination, a fuselage, two U shaped rails located opposite each other in a fore and aft direction in said fuselage so as to form a roller track, said track being closed at its front part and open at its rear part, a detachable nacelle, a plurality of rollers on said nacelle, adapted to roll in said rails, an auxiliary supporting plane on said airplane, said auxiliary plane comprising two parts, first a grid and, secondly, a smooth continuous surface located under said grid and adapted to shield it against the relative wind, and a parachute sail folded on the upper face of said grid so as to have a substantial part of its inner surface in contact with said grid, parachute ropes connecting said parachute sail to said nacelle, a plurality of tubular vertical posts integral with said fuselage on either side of said nacelle for supporting said auxiliary plane, a rod in each of said tubes adapted to slide therein, the upper ends of said rods being secured to said grid, the length of said rods being such that, when they are in their lower position, the grid is applied upon the plane adapted to shield it, the lower end of at least one of said rods being adapted to cooperate with one of said rollers when the rod is in its lower position so as to lock the nacelle in the front part of the fuselage, and means for moving said rods upwardly in said tubes.

2. An airplane according to claim 1, further comprising, pistons at the lower ends of said rods adapted to slide in said tubes, the means for moving said rods upwardly comprising an air compressor reservoir connected to the lower part of said tubes and means for controlling the inflow of compressed air into said tubes whereby said pistons are actuated upon by the air under pressure thus introduced under the tubes.

3. An airplane according to claim 1, further comprising, a small propeller on said nacelle, a compressed air engine adapted to actuate said propeller so as to allow the pilot to choose his point of landing.

4. An airplane according to claim 1, further comprising, means for rapidly detaching the parachute ropes from the nacelle so as to get rid of the parachute sail immediately upon landing.

IBRAHIM BEN AYAD.